US011090943B2

(12) United States Patent
Nakamura

(10) Patent No.: US 11,090,943 B2
(45) Date of Patent: Aug. 17, 2021

(54) LIQUID AGENT MIST RECOVERY DEVICE

(71) Applicant: RISO KAGAKU CORPORATION, Tokyo (JP)

(72) Inventor: Shunta Nakamura, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/793,587

(22) Filed: Feb. 18, 2020

(65) Prior Publication Data

US 2020/0262206 A1 Aug. 20, 2020

(30) Foreign Application Priority Data

Feb. 20, 2019 (JP) ............................ JP2019-028038

(51) Int. Cl.
*B41J 2/17* (2006.01)

(52) U.S. Cl.
CPC .................................. *B41J 2/1714* (2013.01)

(58) Field of Classification Search
CPC ............. B41J 2/1714; B41J 2002/1728; B41J 2/1721; B41J 2/185; B41J 2/01; B41J 29/17; B41J 2002/1853
USPC ........................................................... 347/34
See application file for complete search history.

(56) References Cited

U.S. PATENT DOCUMENTS 3,986,328 A * 10/1976 Harrap ..................... D01H 4/36 57/301
8,418,330 B2 4/2013 Muenstermann et al.
9,884,484 B2 2/2018 Suzuki
2012/0007916 A1* 1/2012 Kumagai ............. B41J 2/16517 347/34

FOREIGN PATENT DOCUMENTS

JP 2015-134496 7/2015

OTHER PUBLICATIONS

European Search Report, European Patent Office, Application No. 20158527.0, dated Jun. 23, 2020.

* cited by examiner

*Primary Examiner* — Huan H Tran
*Assistant Examiner* — Alexander D Shenderov
(74) *Attorney, Agent, or Firm* — Greenblum & Bernstein, P.L.C.

(57) ABSTRACT

An ink mist recovery device allows suction of ink mist with uniform suction force irrespective of a position on a confronting sheet. The ink mist recovery device includes a recovery casing having multiple suction ports confronting a sheet, and a suction unit connected to the recovery casing. At least one of a size of each of the suction ports and a first suction distance from each of the suction ports to a suction slit is set in accordance with a second suction distance from the suction unit to the suction slit via each of the suction ports so that the suction force is kept uniform at the respective positions on the sheet corresponding to the suction ports. The mist suction force is made uniform over the entire width of the suction slit to improve quality of the printed image without sucking ink droplets required to land.

6 Claims, 4 Drawing Sheets

100
101
103 102
A
111
105
108
P
33
112d
112c
112b
112a
110
B4
B3
B2
B1

UP
DOWN
LEFT
RIGHT

LIQUID AGENT MIST RECOVERY DEVICE

BACKGROUND OF THE INVENTION

The present invention relates to a liquid agent mist recovery device that is installed in a liquid agent application device for discharging the liquid agent to a sheet being carried, and is configured to allow a suction unit to suck the liquid agent mist generated during discharge of the liquid agent into a duct for recovery. Particularly, the present invention relates to the liquid agent mist recovery device capable of sucking the liquid agent mist with uniform suction force at an arbitrary position on the sheet that faces the device.

Japanese Unexamined Patent Application Publication No. 2015-134496 discloses the ink mist recovery device intended to suppress adhesion of the ink mist to the inner surface of the suction flow path. According to the ink mist recovery device of the present invention, as FIG. 2 of the disclosure shows, the mist recovery device 3 is disposed apart from the recording head 1 with a predetermined gap at the downstream side in a carrier direction Y of the recording medium 5. The mist recovery device 3 sucks air above the recording medium 5 together with the ink mist M from the suction port 4 that faces the recording medium 5 through the suction passage 10. The gas is blown from the outlet port 9 to the inside of the suction passage 10.

SUMMARY OF THE INVENTION

It is assumed that the mist recovery device 3 is disposed close behind the recording head 1 (inkjet head) parallel to the head row in the sheet carrier direction Y (see FIG. 2 of the disclosure) like the ink mist recovery device as disclosed in Japanese Unexamined Patent Application Publication No. 2015-134496. Referring to FIG. 2 in the disclosure, if the suction unit 11 for suction of the slit-like suction port 4 is connected to the mist recovery device 3 at a far side in the direction perpendicular to the drawing, the ink mist suction force at the far side of the device near the suction unit 11 becomes relatively strong to suck the ink droplet required to land on the roll sheet. On the contrary, the ink mist suction force at the near side of the device apart from the suction unit 11 becomes relatively weak. As a result, a printing density of an image to be formed on the sheet at the far side may be lighter than the printing density of the image at the near side in the width direction orthogonal to the carrier direction. Or, in the above-described condition, the contour of the image may be blurred. In either case, the image quality is deteriorated. Even if the suction unit 11 is connected to the mist recovery device 3 at the center in the direction perpendicular to the drawing, the ink mist suction force varies depending on the position between the center and both ends of the mist recovery device 3 because of a difference in the distance from the suction unit 11. Therefore, deterioration in the image quality as described above, is unavoidable.

The above-described object generally applies, regardless of the purpose, to the contactless type liquid application device configured to apply the discharged liquid agent to the sheet while uniformly sucking the liquid agent mist generated during the discharge at an arbitrary position so that the liquid agent is uniformly applied to the sheet.

The present invention has been made considering the above-described circumstances to provide a liquid agent mist recovery device that is installed in the contactless liquid agent application device, and sucks the liquid agent mist for recovery. Specifically, the liquid agent mist recovery device is capable of sucking the liquid agent mist with uniform suction force at an arbitrary position on the sheet facing the device.

In a liquid agent application device that allows a discharge unit to discharge a liquid agent to a sheet carried in a predetermined direction, the liquid agent mist recovery device according to a first aspect of the invention is disposed at a downstream side of the discharge unit in the predetermined direction. The liquid agent mist recovery device includes a recovery casing having a plurality of suction ports, and a suction unit connected to the recovery casing. At least one of an area of each of the suction ports and a first suction distance from the each of the suction ports to the sheet is set in accordance with a second suction distance from the suction unit to the sheet via the each of the suction ports.

The liquid agent mist recovery device allows suction of the liquid agent mist generated when the discharge unit discharges the liquid agent with uniform suction force at the respective positions on the sheet corresponding to the respective suction ports of the recovery casing. This ensures to suck and recover the liquid agent mist floating above the sheet without bias due to a difference in position. There is substantially no difference in the impact performance of the droplets of the discharged liquid agent due to a difference in position on the sheet. This makes it possible to apply the liquid agent to the sheet under the same condition according to the intended purpose.

DETAILED DESCRIPTION OF THE PREFERRED EMBODIMENTS

An embodiment of the present invention will be described referring to FIGS. 1 to 4. This embodiment relates to an inkjet printer 1 provided with an ink mist recovery device 100. The ink mist recovery device 100 is one specific example of the liquid agent mist recovery device according to the present invention. The inkjet printer 1 is a preferred example to which the ink mist recovery device is applied.

Figure 1:
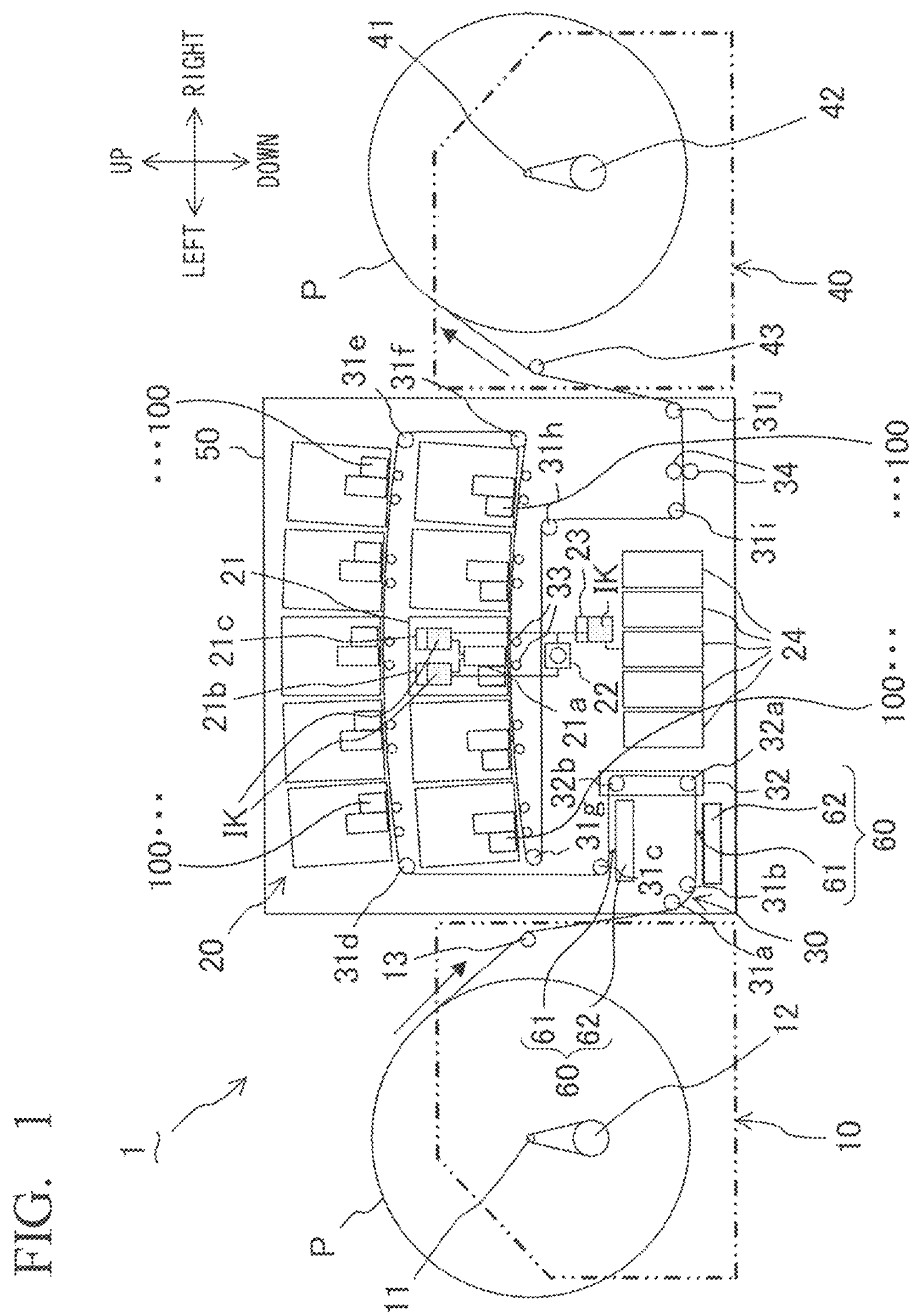
FIG. 1 is an overall structure view of an inkjet printer according to an embodiment.

FIG. 1 is an overall structure view of the inkjet printer 1 according to the embodiment in a front view. Descriptions indicating directions such as an up-down direction, a left-right direction (those 2 directions are indicated by arrows in FIG. 1), and a front-rear direction (direction perpendicular to the drawing) are mere terms for convenience of explanation. Specifically, the up-down direction refers to the vertical direction. The left-right and the front-rear directions refer to those orthogonal to each other in the horizontal plane.

As FIG. 1 shows, the inkjet printer 1 includes an unwinding unit 10 as a sheet feeder for feeding a continuous sheet P, a print section 20 for printing the continuous sheet P fed from the unwinding unit 10, an ink mist recovery device 100 installed in the print section 20, a carrier section 30 for carrying the continuous sheet P, a winding unit 40 as a winder for winding the printed continuous sheet P, a casing 50, and two dust removers 60. The ink mist recovery device 100 will be described later in detail.

The inkjet printer 1 as shown in FIG. 1 is configured to perform printing on the long belt-like continuous sheet P as a web (rolled sheet) wound in a roll state. The continuous sheet P is an example of a continuous medium. The continuous medium may take an arbitrary form such as a film other than paper. The inkjet printer 1 allows the unwinding unit 10 and the winding unit 40 to be separately disposed. In other words, the inkjet printer 1 may be configured to exclude the unwinding unit 10 and the winding unit 40. The unwinding unit 10 and the winding unit 40 may be installed in the print section 20 as separate retrofit units. A printing method is not limited to the inkjet printing method.

As FIG. 1 shows, the unwinding unit 10 includes a roll support shaft 11, a brake 12, and a guide roller 13. The roll support shaft 11 rotatably supports the rolled continuous sheet P. The rolled continuous sheet P is unwound while being rotated with the roll support shaft 11. The brake 12 is a unit for braking the rotation of the roll support shaft 11, for example, a power brake. As the brake 12 applies braking force to the rotation of the roll support shaft 11, the tension is applied to the continuous sheet P between the rolled continuous sheet P and a carrier roller pair 34 to be described later. The guide roller 13 guides the unwound continuous sheet P in a longitudinal direction (axial direction) as the front-rear direction. The unwinding unit 10 further includes a frame indicated by a two-dot chain line, and a motor (not shown) for driving the brake 12.

As FIG. 1 shows, the print section 20 includes a head unit 21, a circulation pump 22, a sub-tank 23, and ink supplying tanks 24. The print section 20 is disposed in the casing 50. There are ten head units 21, ten circulation pumps 22, and ten sub-tanks 23, respectively corresponding to, for example, five colors for surface printing and five colors for back surface printing. There are five ink supplying tanks 24 corresponding to, for example, five colors, respectively. An ink IK has colors of black (K), cyan (C), magenta (M), yellow (Y), and a reserve color as arbitrary color such as red, light cyan, and gray.

The head unit 21 includes an inkjet head 21*a*, a pressure tank 21*b*, and a negative pressure tank 21*c*. Each of ten head units 21 is detachably arranged in the inkjet printer 1.

The ink IK is supplied to the negative pressure tank 21*c* from the ink supplying tank 24 via the sub-tank 23. The ink IK that has not been consumed by the inkjet head 21*a* is resupplied thereto by the circulation pump 22 via the negative pressure tank 21*c* and the pressure tank 21*b*. As described above, the print section 20 is configured as a circulation type for circulating the ink IK. However, the print section 20 may be configured as a non-circulation type.

As FIG. 1 shows, the carrier section 30 includes guide rollers 31*a* to 31*j* each as a carrier unit, a meandering control unit 32, a support member 33, and the carrier roller pair 34. The carrier section 30 is disposed in the casing 50.

The guide rollers 31*a* to 31*j* guide the continuous sheet P unwound from the unwinding unit 10 in the casing 50 in the longitudinal direction (axial direction) as the front-rear direction. The guide rollers 31*a*, 31*b* guide the continuous sheet P between the unwinding unit 10 and the meandering control unit 32. The guide rollers 31*c* to 31*i* guide the continuous sheet P between the meandering control unit 32 and the carrier roller pair 34. The guide roller 31*j* guides the continuous sheet P between the carrier roller pair 34 and the winding unit 40.

The meandering control unit 32 includes meandering control rollers 32*a*, 32*b* for correcting meandering of the continuous sheet P. The front-rear direction with respect to the meandering control rollers 32*a*, 32*b* corresponds to the longitudinal direction (axial direction). Based on the meandering state of the continuous sheet P detected by an unshown sensor, the meandering control unit 32 adjusts an inclination of the continuous sheet P to the front-rear direction.

Two support members 33 are disposed below each of the head units 21 in the longitudinal direction (axial direction) as the front-rear direction. Ten support members 33 disposed between the guide rollers 31*d* and 31*e*, and ten support members 33 disposed between the guide rollers 31*f* and 31*g* are arranged to form protrusive curves upward, respectively. The tensile force is applied to the continuous sheet P between the guide rollers 31*d* and 31*e*, and the guide rollers 31*f* and 31*g*, respectively to keep the stable position.

The carrier roller pair 34 is driven by an unshown motor (an example of a carrier drive unit (actuator)) to carry the continuous sheet P while being nipped.

As FIG. 1 shows, the winding unit 40 includes a winding shaft 41, a winding motor 42, and a guide roller 43. The winding shaft 41 winds up the continuous sheet P in the roll state. The wound continuous sheet P is subjected to post treatment such as cutting. The winding motor 42 is another example of the carrier drive unit (actuator) for rotating the winding shaft 41 clockwise in FIG. 1. The guide roller 43 guides the continuous sheet P just before it is wound up by the winding shaft 41 in the longitudinal direction (axial direction) as the front-rear direction. The winding unit 40 further includes a frame indicated by the two-dot chain line.

As FIG. 1 shows, two dust removers 60, 60 are installed in the inkjet printer 1. The two dust removers 60, 60 are disposed in a predetermined space at a left lower side in the casing 50 of the inkjet printer 1. The two dust removers 60, 60 are vertically arranged at the upstream side and the downstream side of the carrier direction of the continuous sheet P so that both lower and upper surfaces of the continuous sheet P come into contact with those dust removes, respectively.

The dust remover 60 includes a dust removing unit 61 as a brush in contact with the lower surface of the continuous sheet P to remove the dust therefrom, and a tray-like dust receiving unit 62 to which the dust removing unit 61 is attached for receiving the dust removed by the dust removing unit 61 from the continuous sheet P. The dust remover 60 is movable between a cleaning position (refer to FIG. 1) and a release position. At the cleaning position, the dust removing unit 61 comes into contact with the lower surface of the continuous sheet P. At the release position, the dust removing unit 61 is released from the lower surface of the continuous sheet P as a result of movement of the dust removing unit 61 and the dust receiving unit 62 in the direction perpendicular to the drawing to the outside of the casing 50.

As FIG. 1 shows, in the print section 20 as described above, the ink mist recovery devices 100 are adjacently disposed at the downstream side of the respective head units 21 in the carrier direction of the continuous sheet P. The ink mist recovery device 100 will be described referring to FIGS. 2 to 4.

Figure 2:
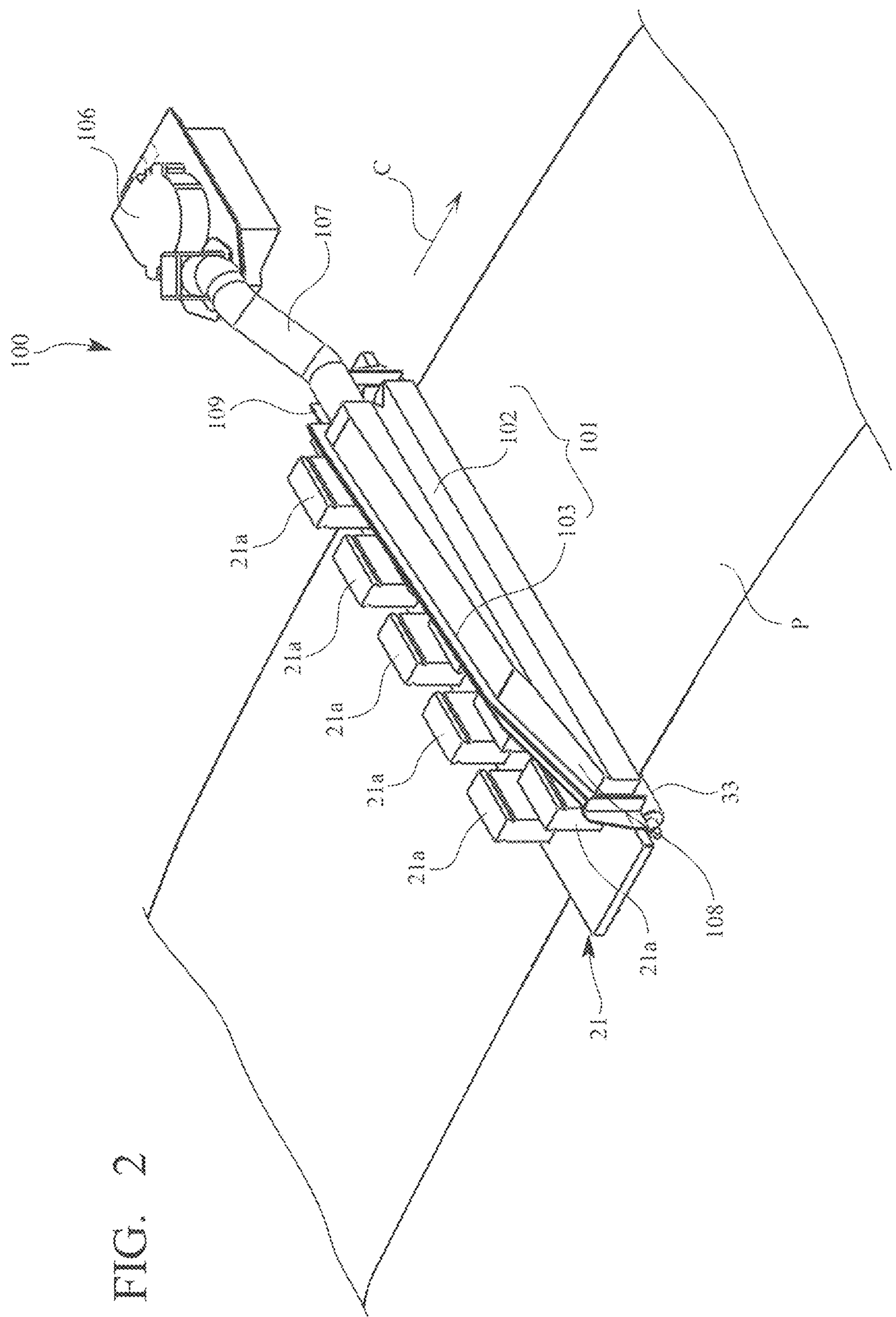
FIG. 2 is an enlarged perspective view of an ink mist recovery device installed in the inkjet printer according to the embodiment.
Figure 3:
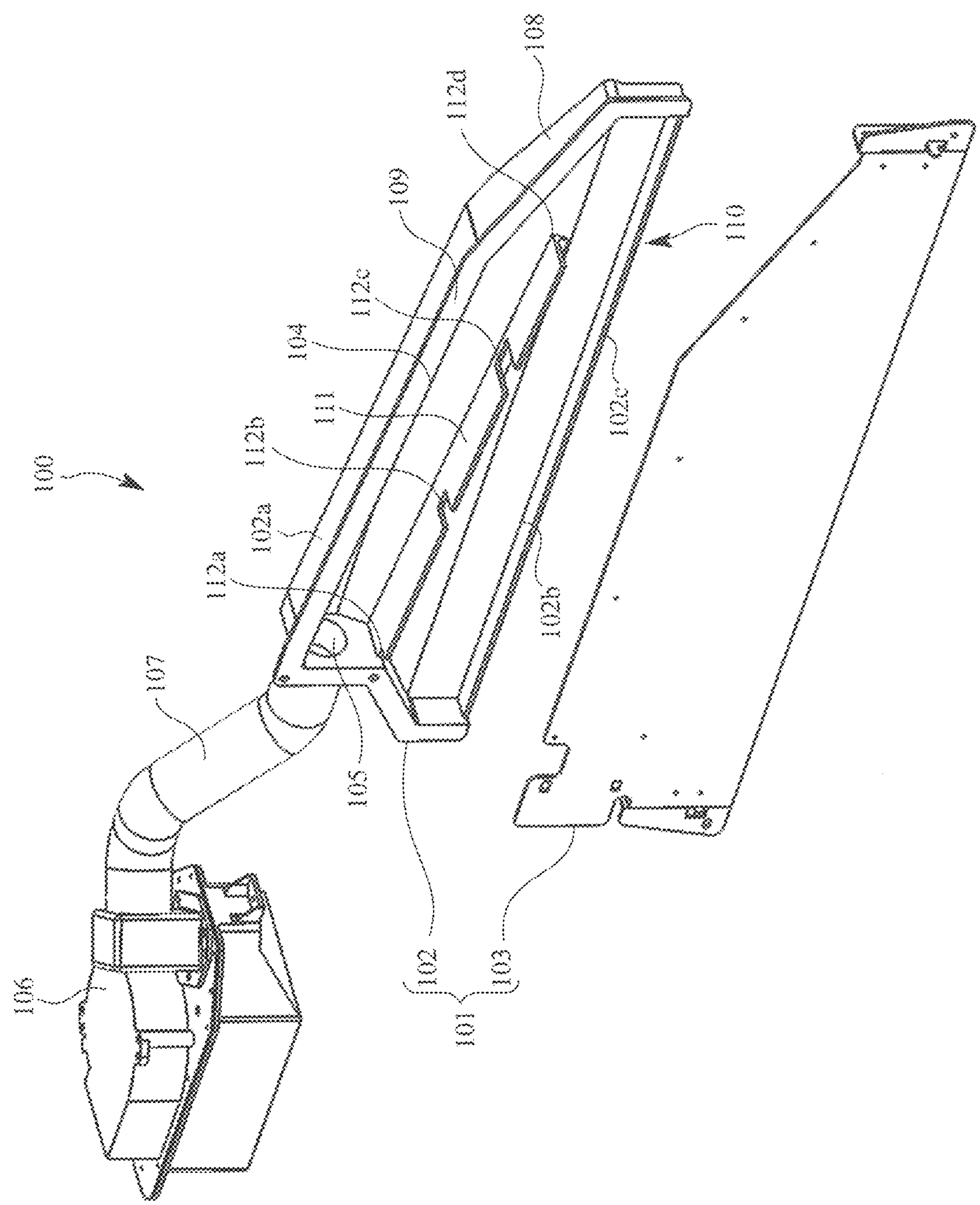
FIG. 3 is an exploded perspective view of the ink mist recovery device installed in the inkjet printer according to the embodiment.

FIG. 2 shows one of the multiple head units 21 as shown in FIG. 1, and the ink mist recovery device 100 disposed at the downstream side of the head unit 21 in the carrier direction of the continuous sheet P as seen from the downstream side in the carrier direction. FIG. 3 is an exploded perspective view of the ink mist recovery device 100 shown in FIG. 2 as seen inclinedly from the upstream side in the carrier direction.

As FIG. 2 shows, the head unit 21 includes ten inkjet heads 21*a* that are divided into two groups each including five inkjet heads arranged in two lines parallel to the width direction of the continuous sheet P orthogonal to the carrier direction C in a zigzag state. As described above, each of the inkjet heads 21*a* is connected to the pressure tank 21*b*, the negative pressure tank 21*c*, and other components. FIG. 2 omits those structures, and the cover or the like for storing those structures.

As FIGS. 2 and 3 show, the ink mist recovery device 100 includes a recovery casing 101 disposed above the continuous sheet P to be carried. The recovery casing 101 is a thin hollow box with a length equal to or slightly longer than the width of the continuous sheet P, and a dimension (thickness) in the carrier direction C, which is smaller compared with the length.

As FIG. 3 shows, the recovery casing 101 includes a box part 102 having an opening 104 in a back surface at the upstream side of the carrier direction C, and a back surface plate 103 to be fitted to the opening 104 of the box part 102. A connecting port 105 is formed in the upper part of the box part 102 at the rear end side. The connecting port 105 is connected to a recovery fan 106 as a suction unit via a suction pipe 107. As an upper wall portion 102*a* has its height gradually reduced in the width direction, a leading end side of the box part 102 is formed into a pointed portion 108.

As FIG. 3 shows, a flange 109 is continuously formed along a circumference of the opening 104 of the box part 102 of the recovery casing 101 except a bottom wall portion 102*b*. The dimension of the box part 102 in the carrier direction C, that is, the thickness of the box part 102 corresponding to the bottom wall portion 102*b* with no flange 109 is smaller than the thickness of the box part provided with the flange 109. A side edge 102*c* of the bottom wall portion 102*b* at a side of the opening 104 is located to the rear of the flange 109. When fitting the back surface plate 103 to the flange 109 to close the opening 104 of the box part 102, the back surface plate 103 comes into tight contact with the flange 109 with no clearance. Meanwhile, a slit with a predetermined dimension is generated between the bottom wall portion 102*b* and the back surface plate 103 over the whole length of the box part 102. This slit is a gap for suction of the ink mist with the suction force of the suction fan 106 as described above, and designated as a suction slit 110.

As FIG. 3 shows, a partition plate 111 is disposed in the box part 102 for dividing the inner side of the box part 102 into upper and lower parts. The partition plate 111 having one end fixed to a rear end side of the box part 102 is disposed inclinedly downward from the rear end side of the box part 102 to the pointed portion 108. The other end of the partition plate 111 reaches a position near the pointed portion 108. The width of the partition plate 111 is equal to the thickness of the box part 102 at the part provided with the flange 109. When covering the opening 104 of the box part 102 with the back surface plate 103, the partition plate 111 divides the space inside the box part 102 into the upper and the lower parts. The partition plate 111 has differently sized rectangular holes 112*a*, 112*b*, 112*c* at an end at the rear end of the box part 102, and two positions in the center part. When covering the opening 104 of the box part 102 with the back surface plate 103, the space in the box part 102 is divided by the partition plate 111 into the upper and the lower parts which are not isolated completely. The space inside the box part 102 allows communication between the upper and the lower parts via the three holes of 112*a*, 112*b*, 112*c* as described above. The pointed portion 108 of the box part 102 has a part where the partition plate 111 does not exist, resulting in a large hole 112*d* corresponding to the length of the pointed portion. The large hole 112*d* is larger than the hole 112*c* as the largest hole among those three holes 112*a*, 112*b*, 112*c*. Those four holes 112*a*, 112*b*, 112*c*, 112*d* formed in the partition plate 111 inside the box part 102 serve to suck the ink mist with the suction force of the recovery fan 106 as described above. Those holes will be referred to as suction ports 112*a*, 112*b*, 112*c*, 112*d* in the order from the smallest hole.

Figure 4:
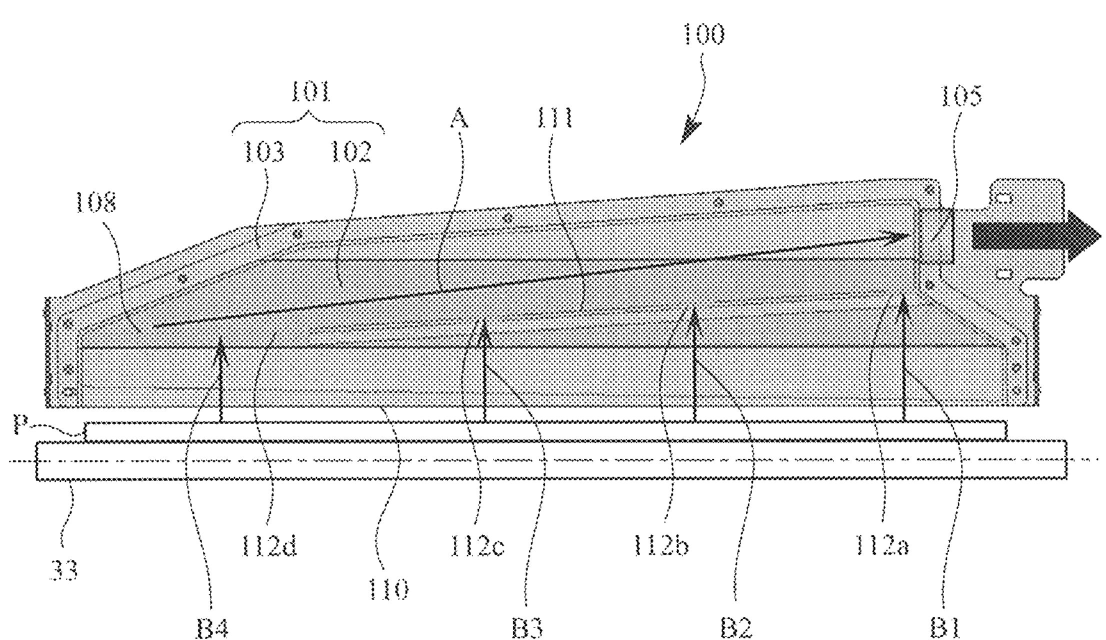
FIG. 4 is a sectional view of the ink mist recovery device installed in the inkjet printer according to the embodiment, taken along a vertical plane parallel to a width direction of a sheet.

FIG. 4 is a sectional view of the ink mist recovery device 100 according to the embodiment, taken along a vertical plane parallel to the width direction of the continuous sheet P. The view is shown for explaining each position of the respective suction ports 112*a*, 112*b*, 112*c*, 112*d* as described above (each position at which the inclined partition plate 111 intersects ports marks B1 to B4 indicates the center of each of the suction holes in the width direction, or the center of the partition plate 111 in the longitudinal direction), a distance from each center of the respective suction ports 112*a*, 112*b*, 112*c*, 112*d* to the continuous sheet P via the suction slit 110, and a distance from the unshown recovery fan 106 to the continuous sheet P via the respective suction ports and the suction slit 110. FIG. 4 does not show each size of the respective suction ports 112*a*, 112*b*, 112*c*, 112*d*.

The embodiment is intended to perform suction of the ink mist generated upon discharging of the ink from the inkjet head 21*a* with the uniform suction force at positions corresponding to the respective suction ports 112*a*, 112*b*, 112*c*, 112*d* each at a predetermined height above the continuous sheet P. There are two factors for establishing the object, that is, each size (opening area) of the respective suction ports 112*a*, 112*b*, 112*c*, 112*d*, and a distance from each center of the respective suction ports 112*a*, 112*b*, 112*c*, 112*d* corresponding to each length of the arrows B1 to B4 to the surface of the continuous sheet P (to be referred to as a first suction distance). At least one of two factors as described above is appropriately set in accordance with a distance from the recovery fan 106 to the continuous sheet P via the respective suction ports 112*a*, 112*b*, 112*c*, 112*d*, and the suction slit 110 (to be referred to as a second suction distance). In other words, the second suction distance serves as a reference for setting the above-described two factors (the opening area and the first suction distance) to appropriate values.

The second suction distance does not have to be the distance from the recovery fan 106 to the surface of the continuous sheet P in the strict sense. Since the distance between the continuous sheet P and the suction slit 110 is kept constant, it is possible to set the distance from the recovery fan 106 to the suction slit 110 via the respective suction ports 112*a*, 112*b*, 112*c*, 112*d* to the second suction distance corresponding to each of the respective suction ports 112*a*, 112*b*, 112*c*, 112*d*. The second suction distance is used in this embodiment from the standpoint as described above. The first suction distance does not have to be the distance from each of the respective suction ports 112*a*, 112*b*, 112*c*, 112*d* to the surface of the continuous sheet P in the strict sense. It is possible to set the distance from each of the suction ports 112*a*, 112*b*, 112*c*, 112*d* to the suction slit

110 as the first suction distance. The first suction distance is used in this embodiment from the standpoint as described above.

Referring to FIG. 4, an arrow A indicates an air flow direction in the upper space above the partition plate 111 in the case where the recovery fan 106 performs suction of the inside of the recovery casing 101. Each of the arrows B (B1 to B4) indicates the air flow direction from the common suction slit 110 to the respective suction ports 112*a*, 112*b*, 112*c*, 112*d* in the lower space below the partition plate 111 in the case where the recovery fan 106 performs suction of the inside of the recovery casing 101.

As FIG. 4 shows, the leading end side of the recovery casing 101 is formed into the pointed portion 108. When an air flow is generated by the recovery fan 106 in the upper space above the partition plate 111, the resistance against the resultant linear air flow as graphically indicated by the arrow A becomes low. If the pointed portion 108 has the angular shape similar to the rear end side (right end side in FIG. 4) connected to the recovery fan 106, air turbulence may occur at the angular portion at the leading end side of the recovery casing 101. This may cause an increase of the suction resistance.

Referring to FIG. 4, each value of the second suction distances of the respective suction ports 112*a*, 112*b*, 112*c*, 112*d* is derived from adding each length of the arrows B1, B2, B3, B4 corresponding to the respective suction ports 112*a*, 112*b*, 112*c*, 112*d* to each length from each top end of the arrows B1, B2, B3, B4 to the unshown recovery fan 106 along the arrow A. Specifically, the second suction distance is the one from the recovery fan 106 to the suction slit 110. The longer the distance becomes, the higher the suction resistance becomes. It is therefore difficult to perform an air suction operation. On the contrary, the shorter the distance becomes, the lower the suction resistance becomes. This makes it possible to easily perform the air suction operation.

Referring to FIG. 4, each value of the first suction distances of the respective suction ports 112*a*, 112*b*, 112*c*, 112*d* corresponds to each length of the respective arrows B1, B2, B3, B4 of the suction ports 112*a*, 112*b*, 112*c*, 112*d*. The first suction distance may be arbitrarily set by changing an inclined angle of the partition plate 111.

As FIG. 4 shows, in the embodiment, the partition plate 111 disposed inside the recovery casing 101 is inclined downward from the connecting port 105 for the recovery fan 106 to the pointed portion 108. If the second suction distance becomes shorter and the suction port 112 is closer to the recovery fan 106, the first distance becomes long, and accordingly, the suction port 112 is disposed at a position apart from the suction slit 110. If the second suction distance becomes longer and the suction port is farther from the recovery fan 106, the first suction distance becomes short, and accordingly, the suction port is disposed at a position close to the suction slit 110.

As described referring to FIG. 3, in the embodiment, each value of the opening areas of the respective suction ports 112*a*, 112*b*, 112*c*, 112*d* formed in the partition plate 111 disposed inside the recovery casing 101 is made smaller as the second suction distance becomes shorter and the suction port 112 becomes closer to the recovery fan 106. Meanwhile, each value of the opening area is made larger as the second suction distance becomes longer and the suction port 112 becomes farther from the recovery fan 106.

As described above, in accordance with the distance from the recovery fan 106, which determines magnitude of the suction force, each opening area of the respective suction ports 112*a*, 112*b*, 112*c*, 112*d*, and each distance between each of the respective suction ports 112*a*, 112*b*, 112*c*, 112*d* and the suction slit 110 are adjusted. Therefore, the suction force at the suction slit 110 is made uniform at an arbitrary position in the longitudinal direction. This makes it possible to recover the ink mist with the uniform suction force with appropriate magnitude at an arbitrary position on the continuous sheet P in the width direction. The impact performance of the ink mist hardly fluctuates irrespective of the position on the continuous sheet P in the width direction. Therefore, quality of the image to be formed on the continuous sheet P is hardly deteriorated. This allows the inkjet head 21*a* installed in the inkjet printer 1 to exhibit the inherent performance for image formation.

A specific effect of the inkjet printer 1 according to the embodiment will be described.

The inkjet printer 1 according to the embodiment has functions of unwinding and carrying the continuous sheet wound in the roll state (roll sheet) from the sheet feeder, printing a desired image on the sheet by the inkjet head, and winding the printed continuous sheet around the winding unit. Since the inkjet head used herein is a printing unit of contactless type for forming the image by discharging ink droplets onto the sheet, the ink mist is inevitably generated in printing. In the printer as described above, downward movement of the floating ink mist is obstructed by the continuous roll sheet. It is therefore necessary to install the ink mist recovery device for recovering the ink mist that has nowhere to go.

Even in the use of the suction type carrier device as the one for carrying the sheet while having the sheet stuck on the belt, the continuous belt-like roll sheet is carried to cover a major part of the suction hole of the belt for the air suction operation continuously. Therefore, it is unlikely that the ink mist floating above the roll sheet is sucked through the suction hole of the belt and removed. If the width of the roll sheet is smaller than that of the belt and the suction holes are opened at both ends of the belt in the width direction, the ink mist may be partially sucked through the suction hole. In the above-described condition, however, the ink mist floating above the sheet cannot be sufficiently recovered.

Accordingly, in the case of the printer of type using the inkjet head to form the image on the roll sheet, unless the ink mist generated in printing is recovered immediately after printing, a subsequent part at the downstream side may be affected. It is therefore preferable to dispose the ink mist recovery device close behind the inkjet head at the downstream side in the roll sheet carrier direction. The inkjet printer 1 according to the embodiment is configured to dispose the ink mist recovery device close behind the inkjet head at the downstream side, and to suck only the generated ink mist at the respective positions on the sheet with uniform suction force without affecting the impact performance of the discharged ink droplets as described above. This ensures to recover the ink mist.

In the case of the printer of type using the inkjet head for forming the image on the cut sheet carried by the suction type carrier device unlike the inkjet printer 1 of the embodiment, the gap exists between the adjacent sheets while being carried. The gap exposes the suction hole formed in the belt for the air suction operation. Therefore, the ink mist floating above the sheet is expected to be sucked to a certain extent from the suction hole of the belt.

In the above-described embodiment, both the respective opening areas of the suction ports 112*a*, 112*b*, 112*c*, 112*d*, and the respective distances (first suction distance) between each of the suction ports 112*a*, 112*b*, 112*c*, 112*d* and the suction slit 110 are adjusted in accordance with the distance (second suction distance) from the recovery fan 106, which determines the magnitude of the suction force. However, it is possible to adjust only one of the above-described factors.

In the above-described embodiment, the recovery fan 106 is connected to one end side (rear end side) of the recovery casing 101 in the longitudinal direction. However, for example, it is possible to connect the recovery fan 106 to the center of the recovery casing 101 in the longitudinal direction. In this case, the suction force becomes the highest at the center, and is lowered from the center toward both sides. The partition plate 111 may be formed into a crest-like shape having its center as the apex while inclining downward toward both ends. The opening area of the suction port may be made larger as the suction port becomes farther apart from the center to both ends.

In the above-described embodiment, the inkjet printer provided with the ink mist recovery device has been explained. However, the ink mist recovery device is only one example of the liquid agent mist recovery device according to the present invention. In addition to the example of the embodiment, the liquid agent mist recovery device according to the present invention may be applied to the pre-treatment liquid mist recovery device for the sheet pre-treatment device, and the post-treatment liquid mist recovery device for the post-treatment device for the printed sheet.

The sheet pre-treatment device is disposed at the upstream side of the print section of the inkjet printer as described above, and configured to apply the pre-treatment liquid to the sheet in the contactless manner. Execution of the pre-treatment may prevent the ink from being blurred as a result of infiltration into the sheet, and further improve fixing of the ink.

The sheet post-treatment device is disposed at the downstream side of the print section of the inkjet printer as described above, and configured to apply the post-treatment liquid to the printed sheet in the contactless manner. Execution of the post-treatment process may protect the newly formed image from being damaged owing to rubbing. It is also possible to make the image shiny for improving the appearance, and to further make the image stereoscopic by applying the post-treatment liquid only to the part where the image is formed.

Structure and Effect of Liquid Agent Mist Recovery Device According to Invention In the liquid agent application device that allows a discharge unit to discharge a liquid agent to a sheet carried in a predetermined direction, the liquid agent mist recovery device according to a first aspect of the invention is disposed at a downstream side of the discharge unit in the predetermined direction. The liquid agent mist recovery device includes a recovery casing having a plurality of suction ports, and a suction unit connected to the recovery casing. At least one of an area of each of the suction ports and a first suction distance from the each of the suction ports to the sheet is set in accordance with a second suction distance from the suction unit to the sheet via the each of the suction ports.

In the liquid agent mist recovery device according to the first aspect, the liquid agent mist generated in discharging of the liquid agent from the discharge unit may be sucked with uniform suction force at the respective positions on the sheet corresponding to the respective suction ports of the recovery casing. This ensures to perform suction and recovery of the liquid agent mist floating above the sheet without bias due to a difference in position. Since the impact performance of the discharged liquid agent droplets hardly fluctuates irrespective of the position on the sheet, the liquid agent may be applied to the sheet under the same condition in accordance with the object.

In the liquid agent mist recovery device according to a second aspect of the invention, a size of the suction port is decreased as the second suction distance becomes shorter.

In the liquid agent mist recovery device according to the second aspect, adjustment is made to decrease the suction force by reducing the size of the suction port even at the position where the second suction distance is short, and the suction force is high. It is possible to obtain the similar effect to the one derived from the first aspect.

In the liquid agent mist recovery device according to a third aspect of the invention, the first suction distance is increased as the second suction distance becomes shorter.

In the liquid agent mist recovery device according to the third aspect, adjustment is made to decrease the suction force by increasing the distance between the suction port and the sheet even at the position where the second suction distance is short, and the suction force is high. It is possible to obtain the similar effect to the one derived from the first aspect.

DESCRIPTION OF REFERENCE SIGNS

1 inkjet printer to which the ink mist recovery device is applied
10 unwinding unit
20 print section
21*a* inkjet head as a discharge unit
30 carrier section
40 winding unit
50 casing
60 dust remover
100 ink mist recovery device as a liquid agent mist recovery device
101 recovery casing
106 recovery fan as a suction unit
112*a*, 112*b*, 112*c*, 112*d* suction port
P continuous sheet as a sheet
C sheet carrying direction

What is claimed is:

1. A liquid agent mist recovery device for a liquid agent application device that allows a discharger to discharge a liquid agent to a sheet carried in a predetermined direction, the liquid agent mist recovery device being disposed at a downstream side of the discharger in the predetermined direction, comprising:
a recovery casing having a plurality of suction ports; and
a suctioner connected to the recovery casing,
wherein a first suction distance from each of the suction ports to the sheet varies in accordance with a second suction distance from the suctioner to the sheet via the each of the suction ports.

2. The liquid agent mist recovery device according to claim 1, wherein a size of each of the suction ports is decreased as the second suction distance becomes shorter.

3. The liquid agent mist recovery device according to claim 1, wherein the first suction distance is increased as the second suction distance becomes shorter.

4. The liquid agent mist recovery device according to claim 1, wherein an area of each of the suction ports varies in accordance with the second suction distance from the suctioner to the sheet via the each of the suction ports.

5. The liquid agent mist recovery device according to claim 1, wherein the recovery casing includes a partition plate that includes the plurality of suction ports, and the partition plate is disposed obliquely relative to the predetermined direction in which the sheet is carried.

6. The liquid agent mist recovery device according to claim 5, wherein the partition plate inclines along the predetermined direction in which the sheet is carried.

* * * * *